United States Patent
Blonde et al.

(10) Patent No.: US 7,379,565 B2
(45) Date of Patent: May 27, 2008

(54) METHOD AND SYSTEM FOR DETERMINING DISPLACEMENT OF A PIXEL, AND RECORDING MEDIUM THEREFOR

(75) Inventors: Laurent Blonde, Thorigne Fouillard (FR); David Sahuc, Rennes (FR); Paul Kerbiriou, Thorigne Fouillard (FR)

(73) Assignee: Thomson Licensing, Boulogne Billancourt (FR)

( * ) Notice: Subject to any disclaimer, the term of this patent is extended or adjusted under 35 U.S.C. 154(b) by 128 days.

(21) Appl. No.: 10/584,645

(22) PCT Filed: Dec. 30, 2004

(86) PCT No.: PCT/FR2004/003417

§ 371 (c)(1),
(2), (4) Date: Jun. 26, 2006

(87) PCT Pub. No.: WO2005/076628

PCT Pub. Date: Aug. 18, 2005

(65) Prior Publication Data
US 2007/0076919 A1    Apr. 5, 2007

(30) Foreign Application Priority Data
Jan. 6, 2004 (FR) ................... 04 00063

(51) Int. Cl.
*G06K 9/00* (2006.01)
(52) U.S. Cl. ............ 382/107; 382/218; 382/255; 382/302; 382/170; 382/190; 382/275; 375/240.17; 385/119; 348/14.1

(58) Field of Classification Search ............... 382/107, 382/103, 218, 255, 302, 170, 190, 275; 375/240.17; 385/119; 352/39; 348/14.1; 356/12
See application file for complete search history.

(56) References Cited

U.S. PATENT DOCUMENTS

| | | | | |
|---|---|---|---|---|
| 5,057,921 A | * | 10/1991 | Robert et al. | 348/459 |
| 5,214,751 A | * | 5/1993 | Robert | 345/606 |
| 5,613,048 A | * | 3/1997 | Chen et al. | 345/419 |
| 6,031,538 A | * | 2/2000 | Chupeau et al. | 345/419 |
| 6,141,041 A | * | 10/2000 | Carlbom et al. | 348/169 |
| 6,876,762 B1 | * | 4/2005 | Ono | 382/154 |

OTHER PUBLICATIONS

Search Report dated Jun. 16, 2005.

* cited by examiner

*Primary Examiner*—Samir Ahmed
*Assistant Examiner*—Nancy Bitar
(74) *Attorney, Agent, or Firm*—Joseph J. Laks; Paul P. Kiel; Brian J. Dorini (57) ABSTRACT

This method determines the displacement of a pixel between a first and a second image, the first image representing, moreover, an object in a first scene taken from given viewpoint, and the second image representing the same object in a second scene, this second scene being obtained from the first scene by moving the object in the first scene and/or by moving the viewpoint of the first scene. The method comprises a definition operation of the colour of at least one point of the object of the second scene according to the position of this point in the first image such that the colour of the pixel of the second image corresponding to this point indicates the position of this pixel in the first image.

6 Claims, 6 Drawing Sheets

METHOD AND SYSTEM FOR DETERMINING DISPLACEMENT OF A PIXEL, AND RECORDING MEDIUM THEREFOR

This application claims the benefit, under 35 U.S.C. § 365 of International Application PCT/FR04/003417, filed Dec. 30, 2004, which was published in accordance with PCT Article 21(2) on Aug. 18, 2005 in French and which claims the benefit of French patent application No. 0400063, filed on Jan. 06, 2004.

The invention relates to a method and a system for determining the displacement of a pixel between two images as well as an image synthesis method and a data recording support for implementing the method.

More precisely, the invention relates to a method for determining the displacement of a pixel between a first and a second image, the first image being synthesised from a first scene containing an object and a given viewpoint, and the second image being synthesised from a second scene containing the same object, this second scene being obtained from the first scene by moving the object in the first scene and/or moving the viewpoint of the first scene.

For many digital processing operations of images, it is necessary to know the position of a point of an object in a first image and the position of this same point in a second image. For example, this data is used to determine a motion vector of this point between the first and second images, that is the amplitude and direction of the displacement or the translation of this point between these two images.

All the motion vectors of all the points of an object or a image are known as motion vector fields.

These fields or motion vectors are particularly used in intermediate image construction methods using temporal interpolation methods.

For example, in known image synthesis methods, a synthesis module supplies only images such as planar images of a scene defined in three dimensions at the output. Hence, currently, to determine the initial position of a pixel in the first image and its final position in the second image, a computation module dedicated to this task must be used in addition to the synthesis module. For this purpose, this computation module works directly on the data defining the three-dimensional scene, namely on the same data as the date processed by the synthesis module.

For example, the computation module establishes the final position of a pixel from data on the displacement of the objects in a scene between the time at which a first and a second image are taken as well as from data on the displacement of the viewpoint between these same times. These computations are long and complicated such that the computation module is itself complex and slow.

The invention aims to overcome this disadvantage by proposing a method for determining the displacement of a pixel between a first and a second image enabling the computation module to be simplified.

The object of the invention is therefore a method as described hereafter, characterized:

in that it comprises, before the synthesis of the second image, a step for defining the colour of at least one point of the object in the second scene according to the position of this point in the first scene in such a manner that the colour or the pixel of the second image corresponding to this point indicates the position of this point in the first image, this definition step comprising:
a projection operation on the object of the second scene of a third image constituted by a set of pixels, in which the colour of each pixel indicates its position in this third image, this third image being projected from a projector whose position relative to the object that it illuminates in the second scene is selected to be the same as the relative position of the viewpoint in relation to this object in the first scene,
an operation for modifying the surface appearance of the object lit in such a manner that the surface of this object diffuses the lighting of the projector towards the viewpoint, and
an operation for removing any spurious light sources capable of modifying the colour diffused by one or more points of the object, and in that after the synthesis of the second image from the second scene in which the colour of at least one point of the object was defined during the definition step, it comprises for this or that point of the object:
an operation for identifying the position and the colour of a pixel of the second image corresponding to this point,
an operation for deducing the position of the point of the object in the first image from the colour identified, and
an operation for determining the displacement of this pixel from the position identified in the second image and from the position deduced from the colour of the pixel.

Thanks to this second image, the determination of the initial and final position of a point of an object is simplified as to do this it is sufficient to identify the position and the colour of a pixel in the second image in order to know the position of the point of the corresponding object respectively in the second image and in the first image. Therefore, the computation module no longer has to perform complicated calculations to determine this data. It will also be noted that the calculation module no longer works on the input data of the synthesis module, namely, the data defining the three dimensional scene, but only on one image, namely two-dimensional data.

The object of the invention is also a method for synthesising images each image being formed by a set of pixels, this method comprising:
a synthesis step of a first image from a first scene, the first image representing, moreover, an object in the first scene taken from a given viewpoint, and
a second synthesis step of a second image from a second scene, this second scene being obtained from the first scene by moving the object in the first scene and/or by moving the viewpoint of the first scene,
a step of determining at least one pixel between the first and second images, this step being realized by implementing a method for determining the displacement of a pixel in accordance with the invention, and
a temporal interpolation construction step of at least one intermediate image between the first and second synthesised images using data on the displacement of the (or each) pixel previously determined.

The object of the invention is also a data recording support, characterized in that it comprises instructions for implementing the determination or synthesis method in accordance with the invention when these instructions are executed by an electronic computer.

The object of the invention is also a system for determining the displacement of a pixel between a first and a second image, the said images being constituted by a set of pixels, the first image being synthesised from a first scene containing an object and a given viewpoint, and the second image being synthesised from a second scene containing the same object, this second scene being obtained from the first scene by moving the object in the first scene and/or moving the viewpoint of the first scene, this system comprising:

a specific image synthesis module suitable for generating images from a three dimensional scene, and a control module capable of activating the synthesis module a first time to generate the first image from the first scene, and activating the synthesis module a second time to generate the second image from the second scene, characterized:

in that the control module is capable of automatically defining the colour of at least one point of the object in the second scene according to the position of this point in the first scene such that the colour of the pixel of the second image corresponding to this point indicates the position of this pixel in the first image, the control module being capable of achieving this by realising:

a projection operation on the object of the second scene of a third image constituted by a set of pixels, in which the colour of each pixel indicates its position in this third image, this third image being projected from a projector whose position relative to the object that it illuminates in the second scene is selected to be the same as the relative position of the viewpoint in relation to this object in the first scene, an operation for modifying the surface appearance of the object lit in such a manner that the surface of this object diffuses the lighting of the projector towards the viewpoint, and an operation for removing any spurious light sources capable of modifying the colour diffused by one or more points of the object, and in that the system comprises a computation module of the displacement of at least one pixel between the first and second images capable, for the (or each) point of the object, of:

identifying the position and colour of a pixel of the second image corresponding to this point, deducing the position of the point of the object in the first image from the colour identified, and determining the displacement of this pixel from the position identified in the second image and from the position deduced from the colour of the pixel.

The invention will be better understood upon reading the following description, provided for information only and referring to the annexed drawings wherein.

Figure 1:
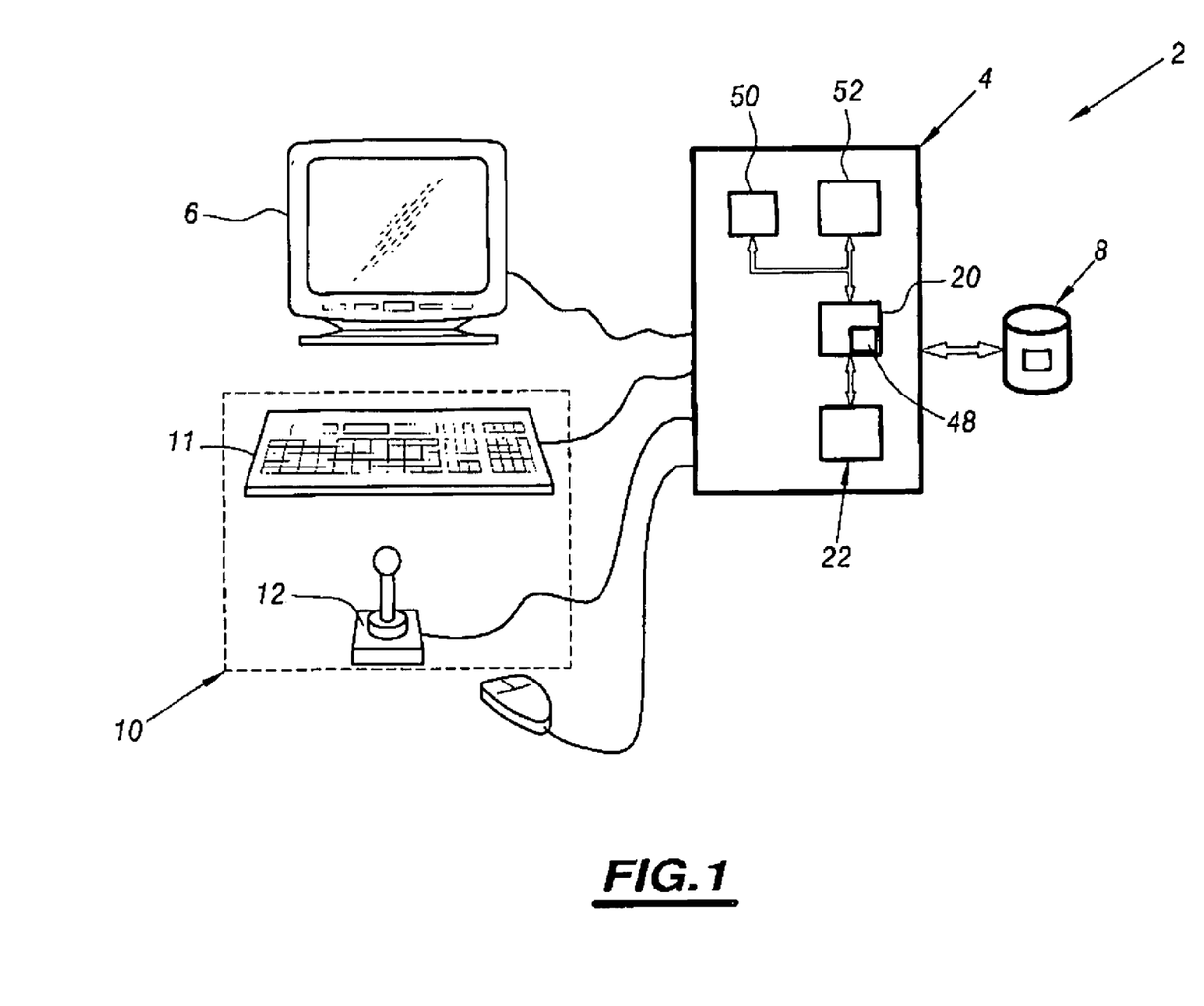
FIG. 1 is a diagrammatic illustration of the architecture of a system in accordance with the invention.

FIG. 1 shows a image synthesis electronic system designated by the general reference 2. This system 2 comprises an electronic computer 4, such as a central unit of a conventional computer, combined with a display screen 6 and a memory 8.

The system 2 also comprises a human/machine interface 10 allowing an operator to enter object displacement commands. As an example, this interface 10 is formed here by an alphanumeric keypad 11 and a control lever 12, more frequently known under term of "joystick".

The computer 4 comprises a digital image synthesis module 20 and a module 22 for controlling this module 20.

Figure 2:
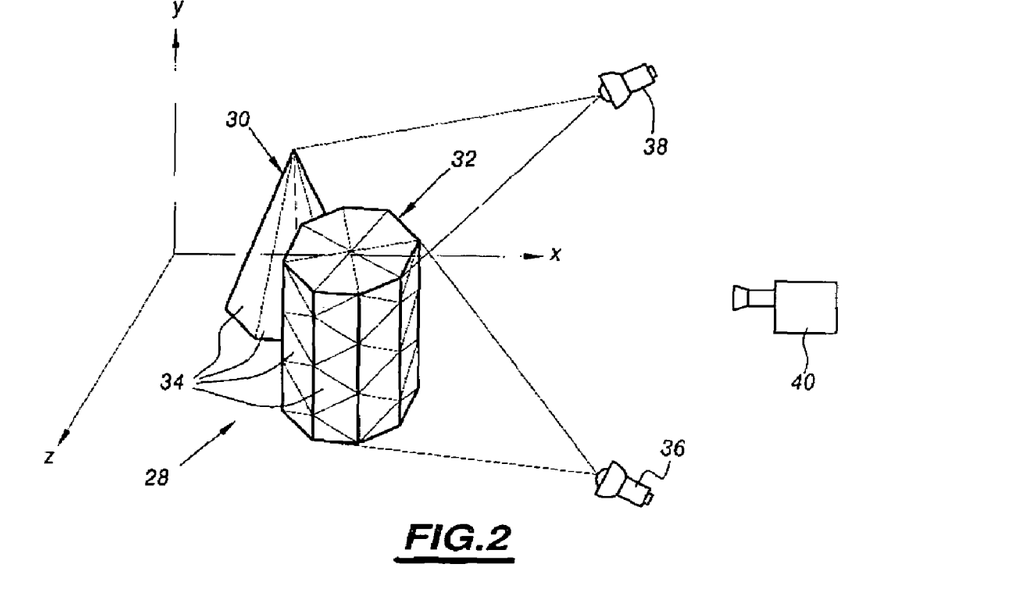
FIGS. 2 and 3 are respectively perspective views of a three dimensional scene.

The module 22 can define a digital model of a three-dimensional scene such as a scene 28 shown in perspective in FIG. 2 at a time T.

For example, the three-dimensional scene used to illustrate the present description comprises only two objects, namely a cone 30 and a cylinder 32 here.

The geometric form of each object is defined by an assembly of several facets contiguous with each other. Here, in FIG. 2, these facets are shown by the triangles 34.

Each facet of each object has a surface appearance. This surface appearance can be adjusted. For example, the texture or the material of this facet, its light reflection factor, its diffusivity can be adjusted.

Typically, a scene also comprises one or more projectors destined to illuminate the objects of the scene. Here, two projectors 36 and 38 are shown in FIG. 2 as an illustration.

For each projector, it is possible to define its position, orientation, field of vision as well as the image projected onto the scene. Moreover, it is possible to define the directivity of the projector, that is, for example, the facets of each object that will be lit by this projector.

Finally, a scene comprises at least one viewpoint shown here by a camera 40. The position, the orientation as well as the field of vision of this camera 40 can be adjusted.

Here, the position of the objects, projectors and camera is defined in relation to orthonormal axes shown by the axes X, Y, Z in FIG. 2.

The control module 22 allows the operator to adjust the different parameters of this scene and in particular to move the objects, the viewpoint or the position of the projectors.

Figure 3:
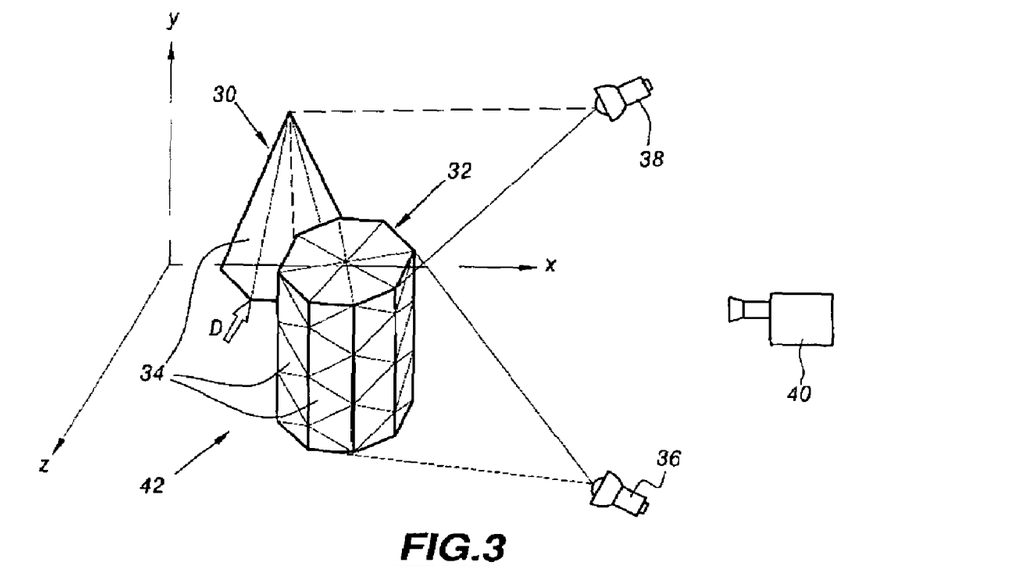

For example, FIG. 3 shows a scene 42 corresponding to the scene 28 at a time T+1 after the cone 30 has been moved along the Z-axis whereas the cylinder 32 remains immobile. This displacement command of the cone 30 is, for example, generated by the operator using the control lever 12. This displacement is noted D and shown by an arrow D in FIG. 3.

The synthesis module 20 is capable of generating a two-dimensional image of the scene defined by the control module 22. More precisely, the module 20 can generate the image of the three-dimensional scene filmed by the camera 40. For example, the module 20 implements for this purpose a known method realized using Open GL technology. Information on this technology can be obtained on-line from the following address: http://developer.apple.com/documentation/GraphicsImaging/Conceptual/OpenG L/chap2/chapter_2_section_3.html FIGS. 4 and 5 show images 44 and 46 synthesized by module 20 respectively for the scenes 28 and 42.

In the images 44 and 46, the axes Y and Z correspond to those of the orthornormal axes of the scenes 28 and 42.

The images synthesized by the module 20 are suitable for being displayed on the screen 6. For example, here, these images are 256 pixel by 256 pixel images.

Figure 4:
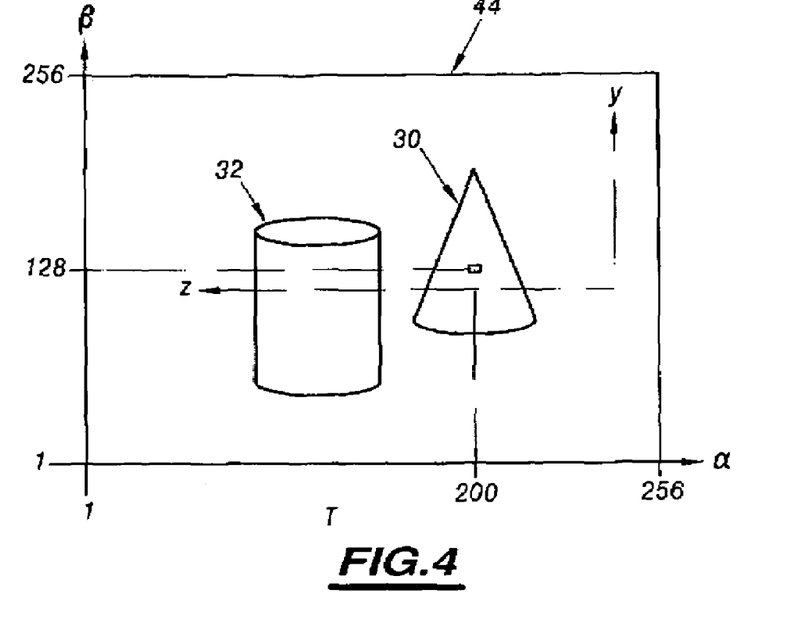
FIGS. 4 and 5 are respectively planar images corresponding to the three-dimensional scenes of FIGS. 2 and 3.
Figure 5:
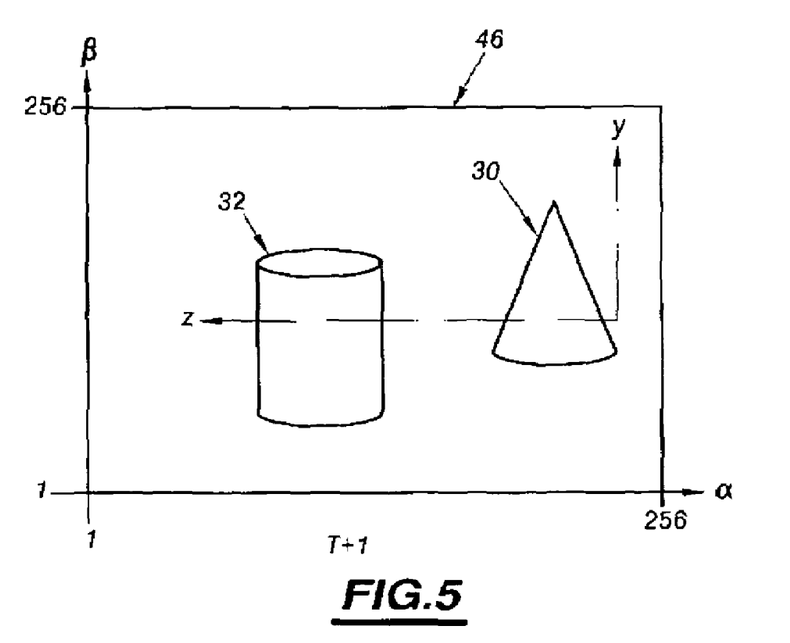

FIGS. 4 and 5 show orthonormal axes $\alpha$, $\beta$ graduated in number of pixels with an origin that corresponds to the pixel in the bottom left-hand corner of the image. The orthonormal axes $\alpha$, $\beta$ enable the position of each pixel of the image to be defined by a pair of coordinates (i, j) where i and j correspond to the coordinates of the pixel respectively on the axes α and β.

The module 20 also comprises a sub-module 48 for smoothing the colours. Indeed, when the surface of a point of an object corresponding to a pixel comprises two different colours separated by a border, it is necessary to adopt a rule that allows the module 20 to assign a single colour to this pixel. Here, in such a situation, the sub-module 48 acts in such a manner as to smooth out the colour difference and thus chooses an intermediate colour between the colours on either side of the border. More precisely, the sub-module 48 determines this intermediate colour to allocate to the pixel by linear interpolation.

The computer 4 also comprises a module 50 for calculating a motion vector field as well as a module 52 for constructing intermediate images.

The module 50 is designed to calculate the motion vector of the pixels between two successive synthesized images. For example, this module 50 can calculate the motion vector of all the pixels of the image 44 between the times T and T+1.

The module 52 can calculate the intermediate images showing the scene filmed by the camera 40 at an intermediate time between the times T and T+1. For this purpose, the module 52 implements a known temporal interpolation method, such as the one described in the patent EP 0 294 282 B1.

Finally, the computer 4 can control the display on the screen 6 of an ordered temporal sequence of images or video sequence formed by the images synthesized by the module 20 between which are inserted the intermediate images constructed by the module 52.

Here, the computer 4 is a conventional programmable electronic computer and the different modules 20, 22, 50 and 52 are for example, software modules.

The instructions corresponding to these software modules are, for example, recorded in the memory 8. These instructions are suitable for the execution of the method of FIG. 6.

Figure 6:
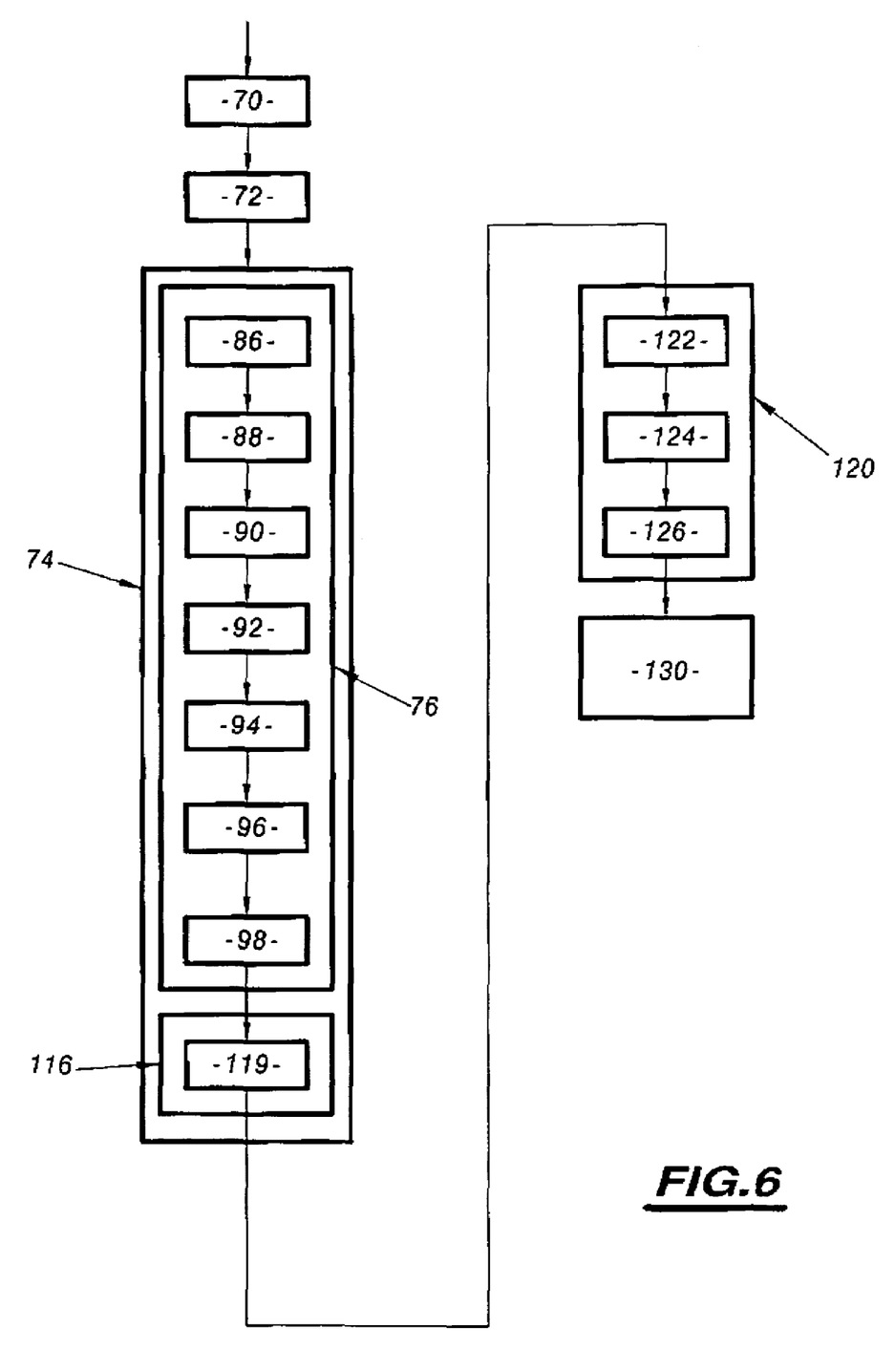
FIG. 6 is a flow chart of a method in accordance with the invention.

The operation of the system 2 will now be described with respect to FIG. 6 and in the particular case of scenes 28 and 42.

Initially, the module 20 synthesises during a step 70, the image 44 from the scene 28 defined by the control module 22.

Next, the module 20 synthesises during a step 72, the image 46 from the scene 42 defined by the control module 22.

The system 2 then goes to a step 74 for generating a third image, for example, identical to the second image 46 except for the fact that each pixel of an object has a colour according to the place that the point of the object corresponding to this pixel occupied at the time T.

Figure 7:
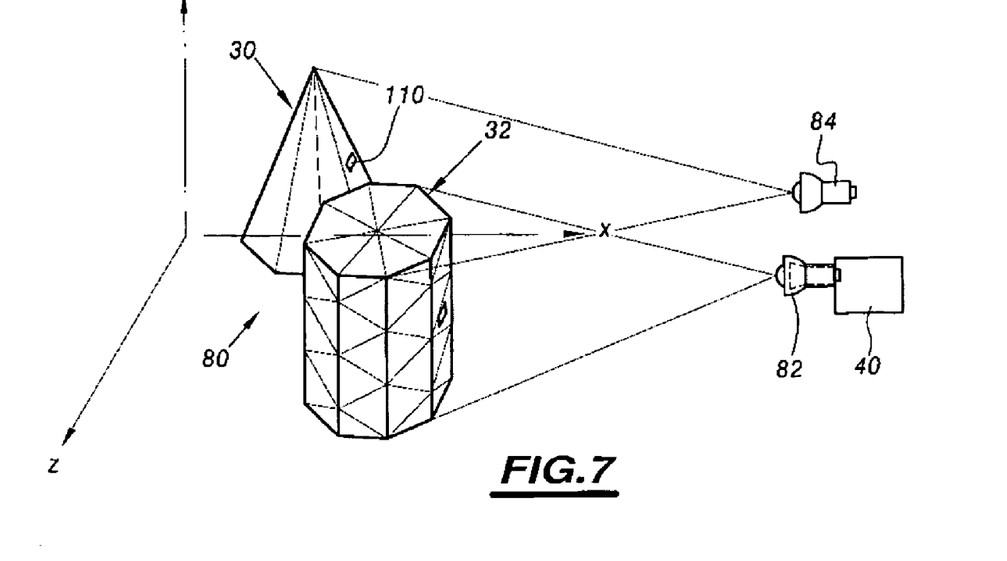
FIG. 7 is a perspective view of the three-dimensional scene of FIG. 3.

For this purpose, the module 22 automatically defines a third scene 80 during an operation 76 (FIG. 7). This scene 80 is identical geometrically to the scene 42 with the exception of the position of the projectors.

Preferably, this scene 80 is constructed from the scene 42 to conserve the identical position of the objects 30 and 32 and of the camera 40.

To construct the scene 80 from the scene 42, the module 22 removes all the projectors or light sources from the scene 42 during a sub-operation 86. Next, the module 22 assigns the same surface appearance to all the objects of the scene 42 during a sub-operation 88. The surface is here chosen in such a manner that the surface of all the objects is perfectly diffusing, namely that the surface does not modify the colour of the light that it reflects and that it distributes it throughout the space with the same value. Hence, when a point of an object is lit with a red beam, this point diffuses a light of the same red throughout the space.

Next, the module 22 creates, during a sub-operation 90, a projector for each part or static object in the scene and a projector for each moving object of the scene. The static objects or parts are the parts or objects that are not moved between the time T and the time T+1, for example the cylinder 32 here. The mobile objects are, on the contrary, the objects that moved between the time T and the time T+1. Preferably, the same single projector will be allocated to a group of several mobile objects if the relative position of these objects with each other remains unchanged between the time T and the time T+1.

Here, a projector 82 is created to illuminate the cylinder 32 whereas a projector 84 is created to illuminate the cone 30.

During the sub-operation 90, the module 22 sets the directivity of the projectors 82 and 84 such that these projectors only illuminate the facets of the object to which they are allocated, which are visible in the image 44.

During a sub-operation 92, the module 22 determines the position of each projector with respect to the object that it illuminates. For this purpose, the position of each projector with regard to the object that it illuminates is chosen such that this position is identical to the position occupied by the camera 40 with regard to this same object in the scene 28. Consequently, since here neither the position of the cylinder 32 nor the position of the camera 40 have been modified between the times T and T+1, the projector 82 that illuminates the cylinder 32 is placed at the same position as the camera 40. However, for the projector 84 to be placed with regard to the cone 30 in the same position as the camera 40 in the scene 28, the position of the projector 84 is offset by a distance D along the Z-axis from the position of the camera 40. This distance D is identical to the amplitude of the displacement D of the cone 30.

Hence, the projector 84 remains, so to speak, immobile with respect to the cone 30 in spite of the displacement of this cone between the times T and T+1.

This manner of proceeding for positioning the projectors of the scene 80 enables a relationship to be created between the position in the image 44 of the points of each object illuminated by the projector and the colour with which these points will be illuminated during one of the following sub-operations. Moreover, the choice consisting of placing the projector opposite the object that it illuminates in the same position as the position that the camera 40 occupies at the previous time, that is the time T, maximises the illuminated surface of the object that can be used to determine motion vector fields, for example.

During a sub-operation 94, the field of vision of each projector is adjusted so as to correspond to the field of the camera 40 at time T, then, during a sub-operation 96, each projector is also oriented like the camera 40 at the time T.

Finally, during sub-operation 98, the module 22 defines the image projected by each projector on the object that it illuminates. In the projected image, the colour of each pixel is connected by a biunivocal function to the position of this pixel in this image such that the colour of the pixel indicates its position or, in other words, identifies the line and column of the pixel in the image.

The number of colours possible is greater than the number of pixels of the images synthesized and preferably at least 2, 3 or 4 times greater than the number of pixels of the images synthesized. To simplify the description, each colour is represented by a pair of values (k, l) where k represents, for example, the quantity of red and l the quantity, for example of green. In the example described here, it is assumed that there are three times more colours possible than there are pixels. Hence, as the synthesized images are images of 256/256 pixels, the maximum quantity of red or green will be represented by the value 768 whereas the minimum quantity will be represented by the value 1, the values k and l being able to have all the integer values between 1 and 768.

Figure 8:
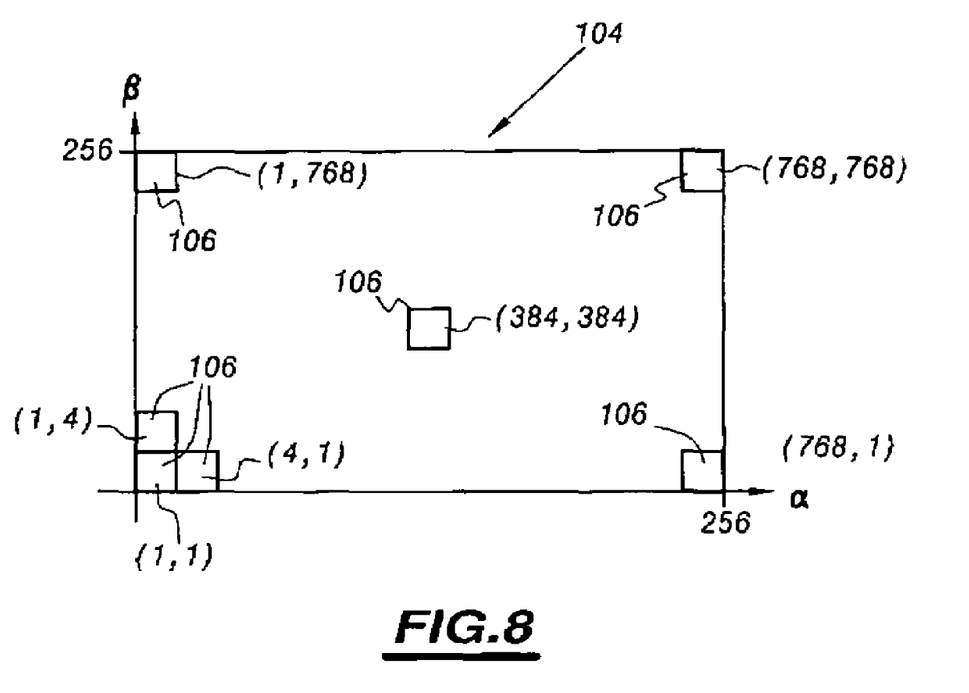
FIG. 8 is a diagrammatic illustration of a image projected onto the scene of FIG. 7.

Here, all the projectors of the scene 80 project the same image namely a image 104 (FIG. 8). FIG. 8 comprises axes α, β identical to the one in FIGS. 4 and 5 in such a manner as to identify the pixels of the image 104. As an example, only a few pixels of this image 104 are shown by squares 106. The colours associated with each of these pixels are shown by a pair of values (k, l) indicated within brackets in this figure. The colours associated with the pixels of the image 104 are organised in such a manner as to create a gradient of colours along the axis α and along the axis β. Hence, the pixel located on the origin of the axes α and β is associated with the colour (1, 1). From this pixel, the values of the parameter k assigned to each pixel of the image 104 form a geometric progression with a common ratio of 3 going from left to right along the axis α. In a similar manner, the values of the parameter l of each pixel form a geometric progression with a common ratio of 3 along the axis β moving away from the pixel having the colour (1,1).

Hence, the pixel located at the top right-hand corner, namely the one placed at the intersection of the 256$^{th}$ pixel line and the 256$^{th}$ pixel column, is associated with the colour (768,768). From this point on, in the image 104, knowing the colour of a pixel, it is possible to find its coordinates i, j in the axes α, β by a simple rule of three.

It is understood, therefore, that in the scene 80, because of the choice of the position of the projectors 82 and 84 with regard to the objects 32 and 30 and to the coding of the colours in the projected image 104, each point of the illuminated object can be allocated a colour according to the position that it occupies in the image 44.

Once the construction of the scene 80 is terminated, the module 20 goes to a synthesis step 116 of a image 118 (FIG. 9) filmed from the camera 40 of the scene 80. The image 118 is identical to the image 46 except for the fact that the colour of the different pixels of an object depends on the position of the point corresponding to the object in the image 44. In particular, the position of the objects 30 and 32 is identical to the position of these same objects in the image 46.

Figure 9:
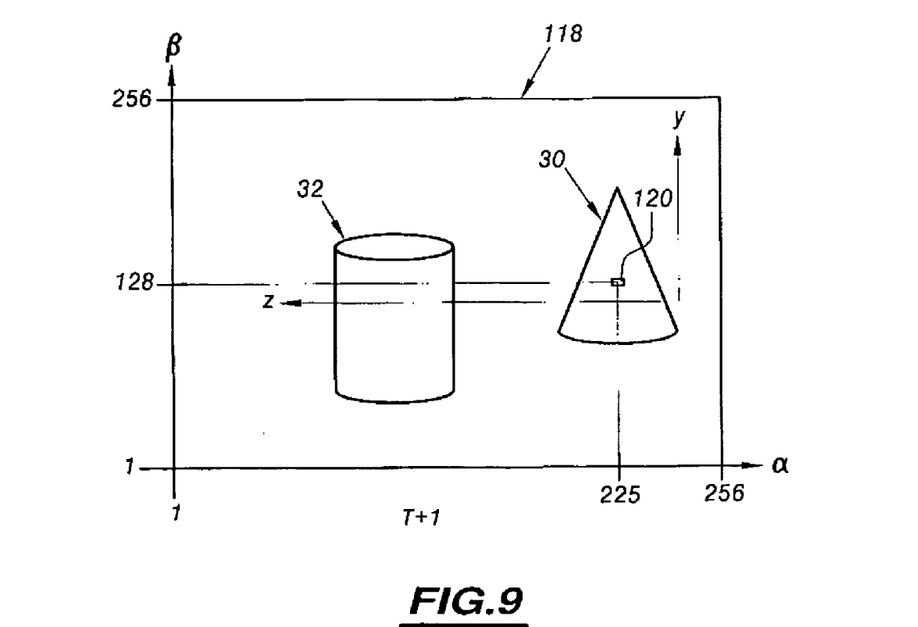
FIG. 9 is a planar image corresponding to the scene of FIG. 7.

During the synthesis of the image 118, the sub-module 48 proceeds with a smoothing operation 119 of the colours. Hence, the pixels of the image 118 can be assigned an intermediate colour between the colours of the pixels 106 of the image 104. This is possible owing to the fact that the number of colours possible is greater than the number of pixels of the image. From this point on, it is possible to measure the displacements to an accuracy less than the pixel as will be understood from reading the rest of this description.

When the synthesis operation of the image 118 is terminated, the module 50 calculates the motion vector field during a step 120. For this purpose, it identifies, during an operation 122, the position and colour of the pixels of the image 118. For example, it identifies that the position of a pixel 120 (FIG. 9) is (225; 128) and that its colour is (599; 384).

Next, during an operation 124, it deduces the position of this pixel in the image 44 from the colour identified. For example, for the pixel 120 it deduces that the colour (599; 384) corresponds to the position (199.6666; 128) in the axes α, β.

Finally, during an operation 126, it determines the motion vector of each pixel by subtracting the initial position deduced during the operation 124 from the position identified.

For example, for the pixel 120, the motion vector is equal to (25.3333; 0).

The operations 122 and 126 are reiterated for all the pixels of each object which are illuminated by one of the projectors of the scene 80.

When the motion vector field is calculated, the module 52 constructs, during a step 130, intermediate images representing the objects 30 and 32 at intermediate times between the times T and T+1. For this purpose, the module 52 implements a temporal interpolation method and uses the motion vector field calculated during the step 120.

During this step 130, the module 52 constructs at least one intermediate image and preferably two, five or ten intermediate images between the times T and T+1.

Finally, the temporal sequence of images formed by the images 44 and 46 synthesized at the times T and T+1, between which are inserted the intermediate images constructed during step 130, is displayed on the screen 6.

The construction step 130 of an intermediate image by temporal interpolation is more rapid than the synthesis of a image by the module 20. From this point, the above method has the advantage of being quicker than the known image synthesis methods. Indeed, the known image synthesis methods synthesise each image of a temporal sequence of images using the module 20. Consequently, for a temporal sequence of seven images, the module 20 will be run seven times. In contrast, in the method of FIG. 6, to generate a temporal sequence of seven images, the module 20 is activated three times respectively to generate the images 44, 46 and 118 whereas the five intermediate images of the temporal sequence are constructed by temporal interpolation. Hence, it has been measured that the total time required to construct this temporal sequence of seven images using the method of FIG. 6 is very clearly less than the time required to construct a temporal sequence of seven images using known image synthesis methods.

The method has been described in the particular case in which only a image 118 constructed to determine the motion vector field. As a variant, the method of FIG. 6 is modified to construct a image in which the colours of the pixels indicate the position of the points of the objects corresponding to the time T and another image in which the colours of the pixels indicate the position of the points of the objects at the time T+1. To construct these two images, the step 74 is realized by taking once as starting image the image taken at a time T and as final image the image taken at a time T+1 and a second time by taking as starting image the image at the time T+1 and as final image the image taken at the time T. In this variant, the step 120 is executed for these two images in such a manner as to obtain two motion vector fields and the step 130 is preceded by a step consisting of computing the weighted average of these two motion vector fields. The calculation of the motion vector field once in one direction, that is from the time T to the time T+1, and once in the other direction, that is from the time T+1 to the time T, enables the accuracy of the motion vector field calculation to be improved.

The invention claimed is:

1. Method for determining the displacement of a pixel between a first and a second synthesis image, said images being constituted by a set of pixels, the first image being synthesised from a first scene containing an object and a given viewpoint, and the second image being synthesised from a second scene containing the same object, this second scene being obtained from the first scene by moving the object in the first scene and/or moving the viewpoint of the first scene, comprising:

before the synthesis of the second image, a step for defining the colour of at least one point of the object in the second scene according to the position of this point in the first scene in such a manner that the colour or the pixel of the second image corresponding to this point indicates the position of this point in the first image, this definition step comprising:

a projection operation on the object of the second scene of a third image constituted by a set of pixels, in which the colour of each pixel indicates its position in this third image, this third image being projected from a projector whose position relative to the object that it illuminates in the second scene is selected to be the same as the relative position of the viewpoint in relation to this object in the first scene, an operation for modifying the surface appearance of the object lit in such a manner that the surface of this object diffuses the lighting of the projector towards the viewpoint, and an operation for removing any spurious light sources capable of modifying the colour diffused by one or more points of the object, and also comprising after the synthesis of the second image from the second scene in which the colour of at least one point of the object was defined during the definition step, for this or that point of the object:

an operation for identifying the position and the colour of a pixel of the second image corresponding to this point, an operation for deducing the position of the object in the first image from the colour identified, and an operation for determining the displacement of this pixel from the position identified in the second image and from the position deduced from the pixel colour.

2. Method according to claim 1, wherein the number of colours possible for a pixel of the third image is strictly greater than the number of pixels of the first image.

3. Method according to claim 1, wherein the colour of the pixels of the third image is an increasing or decreasing monotone function of the position of the pixel in this third image.

4. Method according to claim 3, wherein the third image has a colour gradient in two non-colinear directions.

5. Data recording support, wherein comprises instructions for executing a method in accordance with claims 1, when these instructions are executed by an electronic computer.

6. System for determining the displacement of a pixel between a first and a second synthesis image, said images being constituted by a set of pixels, the first image being synthesised from a first scene containing an object and a given viewpoint, and the second image being synthesised from a second scene containing the same object, this second scene being obtained from the first scene by moving the object in the first scene and/or moving the viewpoint of the first scene, this system comprising:

a specific image synthesis module suitable for generating images from a three dimensional scene, and a control module capable of activating the synthesis module a first time to generate the first image from the first scene, and activating the synthesis module a second time to generate the second image from the second scene, wherein:

the control module is capable of automatically defining the colour of at least one point of the object in the second scene according to the position of this point in the first scene such that the colour of the pixel of the second image corresponding to this point indicates the position of this pixel in the first image, the control module being capable of achieving this by realising:

a projection operation on the object of the second scene of a third image constituted by a set of pixels, in which the colour of each pixel indicates its position in this third image, this third image being projected from a projector whose position relative to the object that it illuminates in the second scene is selected to be the same as the relative position of the viewpoint in relation to this object in the first scene, an operation for modifying the surface appearance of the object lit in such a manner that the surface of this object diffuses the lighting of the projector towards the viewpoint, and an operation for removing any spurious light sources capable of modifying the colour diffused by one or more points of the object, and wherein the system comprises a computation module of the displacement of at least one pixel between the first and second images capable, for the (or each) point of the object, of:

identifying the position and colour of a pixel of the second image corresponding to this point, deducing the position of the point of the object in the first image from the colour identified, and determining the displacement of this pixel from the position identified in the second image and from the position deduced from the colour of the pixel.

* * * * *